(12) United States Patent
Jäberg

(10) Patent No.: US 6,868,935 B2
(45) Date of Patent: Mar. 22, 2005

(54) ARRANGEMENT AND METHOD FOR OPERATING SELF-STEERING WHEELS

(75) Inventor: Björn Jäberg, Ytterby (SE)

(73) Assignee: Volvo Lastvagnar GB, Göteborg (SE)

( * ) Notice: Subject to any disclaimer, the term of this patent is extended or adjusted under 35 U.S.C. 154(b) by 0 days.

(21) Appl. No.: 10/249,072

(22) Filed: Mar. 13, 2003

(65) Prior Publication Data

US 2003/0201135 A1 Oct. 30, 2003

Related U.S. Application Data

(63) Continuation of application No. PCT/SE01/01923, filed on Sep. 10, 2001.

(30) Foreign Application Priority Data

Sep. 13, 2000 (SE) .............................. 0003238

(51) Int. Cl.⁷ ................................ B62D 5/06
(52) U.S. Cl. ................... 180/437; 180/439; 180/414
(58) Field of Search ................. 180/403, 408, 180/411, 414, 417, 434, 437, 439, 440

(56) References Cited

FOREIGN PATENT DOCUMENTS

| DE | 3008461 A1 | 9/1980 |
|---|---|---|
| DE | 2948181 A1 | 6/1981 |
| DE | 19636803 C1 | 11/1997 |
| DE | 19803745 A1 | 8/1999 |
| EP | 0845403 A2 | 6/1998 |
| GB | 2202811 A | 10/1988 |

*Primary Examiner*—Lesley D. Morris
*Assistant Examiner*—Matthew Luby
(74) *Attorney, Agent, or Firm*—Novak Druce & Quigg, LLP

(57) ABSTRACT

Method and arrangement for operating self-steering wheels on a non-driving axle (3) in a vehicle, which wheels (1, 2) are each mounted on their own stub axle (4, 5) and connected to a tie rod (8). The axle (3) and one (4) of the stub axles are connected by a cylinder (12) with two separate chambers (16, 17), each chamber having an individually adjustable piston (22, 23), the cylinder (12) having a first, freely movable state, in which its length is variable, and a second, pressurized state, in which its length (S3) is fixed, and in that each chamber (16, 17) has at least one connection (18, 19, 20, 21) for pressure medium for acting on the respective piston (22, 23) in the cylinder (12).

14 Claims, 6 Drawing Sheets

ARRANGEMENT AND METHOD FOR OPERATING SELF-STEERING WHEELS

CROSS REFERENCE TO RELATED APPLICATIONS

This application is a continuation patent application of International Application No. PCT/SE01/01923 filed 10 Sep. 2001 which was published in English pursuant to Article 21(2) of the Patent Cooperation Treaty, and which claims priority to Swedish Application No. 0003238-3 filed 13 Sep. 2000. Both applications are expressly incorporated herein by reference in their entireties.

BACKGROUND OF INVENTION

1. Technical Field

The invention relates to an arrangement and a method for operating self-steering wheels on a non-driving axle in a vehicle having a specially designed double-acting cylinder that in a first position allows self-steering of the wheels and in a second position locks the wheels in a position parallel to the longitudinal direction of the vehicle.

2. Background Art

As a rule, vehicles provided with more than one rear axle, for example, trucks with twin rear axles of which only one is driven, have problems maneuvering at low speeds and on tight bends. The maximum permitted axle load on many roads often makes it necessary to distribute the weight of the vehicle over a number of axles. There are also regulations laid down by authorities relating to the distance between the axles. These limitations are in opposition to a desire for a short wheelbase in order to obtain a maneuverable vehicle with a small turning radius.

One solution to this problem is to provide the non-driven wheel axle with wheels that are self-steering under certain circumstances. EP 0845403 A2 discloses a hydraulic system in which the position of the wheels is controlled by the power steering of the vehicle, but which results in a complicated solution that requires long runs of hydraulic lines and also a separate hydraulic system for the self-steering wheel pair. GB 2202811 A2 discloses a system with a pair of individually adjustable pistons and mechanical locking devices, which locks have to be released and locked every time the wheels are to be maneuvered. DE 29 48 181 A1 discloses two separate pistons that each act on their own wheel, the wheels being connected to a parallel tie rod. In the latter solution, the pistons are pressurized for traveling straight ahead and unpressurized when self-steering is desired. As both the pistons are spring-loaded, there is a certain risk of fluctuations in the system while traveling straight ahead, as both the pistons lie between their end positions and can thus move in both directions. The system is also sensitive to variations in the pressure from the pressure source. At high speeds, even small fluctuations can give rise to rapid tire wear. In the self-steering position, the wheels have to overcome the spring force of the two return springs before a wheel deflection can be brought about, a function that can result in the wheels lagging behind with increased friction and tire wear as a consequence.

The present invention aims to produce an arrangement for self-steering which solves the problems mentioned above.

SUMMARY OF INVENTION

The abovementioned problems are solved by means of an arrangement for operating self-steering wheels, according to claim 1. The invention relates to a pair of self-steering wheels on a non-driving axle in a vehicle, which wheels are each mounted on their own stub axle and connected to a tie rod. The tie rod is acted on by a steering deflection of both wheels and ensures that these remain parallel. The steering deflection can be acted on by, or itself act on a cylinder with two separate chambers, each chamber having an individually adjustable piston. The piston/cylinder arrangement connects the axle to one of the stub axles, preferably via a steering rod fixed to the stub axle. The cylinder has a first, freely movable state, in which its length is variable, and a second, pressurized state, in which its length is fixed. Each chamber has at least one connection for pressure medium for acting on the respective piston in the cylinder. The invention can be adapted to both pneumatic and hydraulic systems.

A fixed partition is located in the cylinder in order to divide it into a first and a second chamber with two connections each for supply or discharge of pressure medium. The first chamber is provided with a first piston that has a piston rod connected to a stub axle, and the second chamber is provided with a second piston that has a piston rod connected to the axle.

In the first, freely movable state of the cylinder, the connections of the first chamber are open to the atmosphere or an outlet so that the first piston is freely movable.

According to a first preferred embodiment, one connection of the second chamber is pressurized, so that the second piston is displaced into an inner end position located adjacent to the partition. As only the first piston is freely movable, the wheel deflection is proportional to half its stroke length. According to a second alternative embodiment, the connections of the second chamber are open to the atmosphere or an outlet, so that the second piston is freely movable. The wheel deflection in this case is defined by the combined stroke length of the two pistons. The first alternative is preferred because the cylinder is held firmly in a defined position and the first piston constitutes the only movable part.

In the second, pressurized state of the cylinder, one connection of the first chamber is pressurized, so that the first piston is displaced into an inner end position located adjacent to the partition. The second connection of the second chamber is also pressurized so that the second piston is displaced into an outer end position located adjacent to one end surface of the cylinder. By pressurizing both the chambers and moving the two pistons into distinct end positions, the piston/cylinder arrangement adopts a fixed, predetermined length. This length has been selected so that the two wheels are positioned parallel to the longitudinal direction of the vehicle.

The invention also relates to a method for operating self-steering wheels as described above.

BRIEF DESCRIPTION OF DRAWINGS

A number of preferred embodiments of the invention are described below with reference to the accompanying figures, in which.

DETAILED DESCRIPTION

Figure 1:
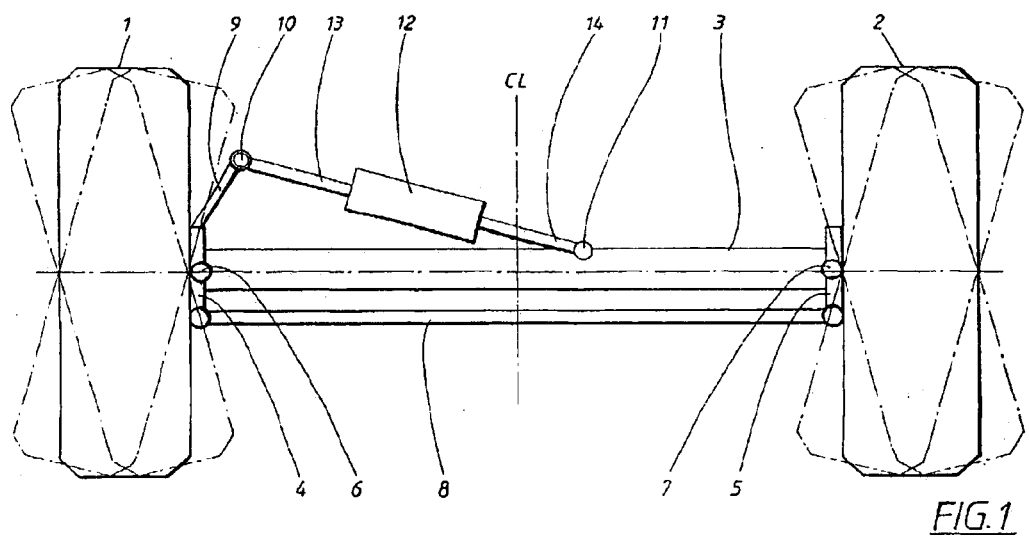
FIG. 1 is a plan view of a cylinder for effecting the wheel deflection.

FIG. 1 shows diagrammatically a pair of self-steering wheels 1, 2 on a non-driving axle 3. The wheels 1, 2 are each mounted on their own stub axle 4, 5, which stub axles are each mounted at the ends of the axle 3 on their own swivel pin 6, 7. In order for the pivoting movement of both wheels 1, 2 to simultaneously take place, the stub axles 4, 5 are connected to a tie rod 8. One stub axle 4 is also provided with a steering rod 9. A cylinder 12 is mounted between the end 10 of the steering rod 9 and a fixing point 11 on the axle 3. The cylinder 12 is provided with a pair of pistons (not shown) with outwardly extending piston rods 13, 14 in each end of the cylinder. A first piston rod 13 is fixed to the steering rod 9, and a second piston rod 14 is fixed to the axle 3. To allow sufficient space for cylinder 12, and in order that its angle to the axle 3 will not be too great, the fixing point 11 is preferably located on the opposite side of the centerline CL of the vehicle relative to the steering rod 9. In this connection, the steering deflection of the wheels is shown by dot-dash lines.

Figure 2A:
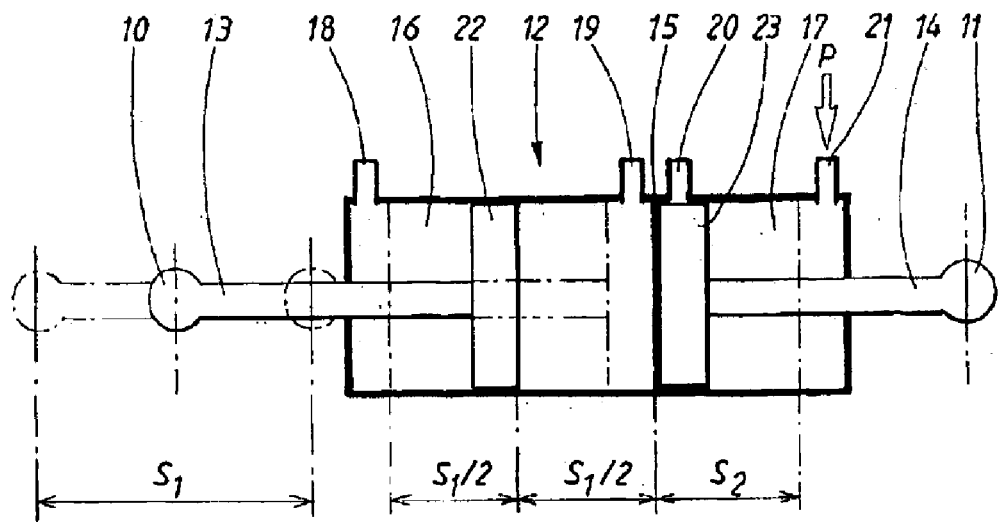
FIGS. 2A and 2B show a cylinder cross section with the component pistons positioned in a freely movable and a fixed position, respectively.
Figure 2B:
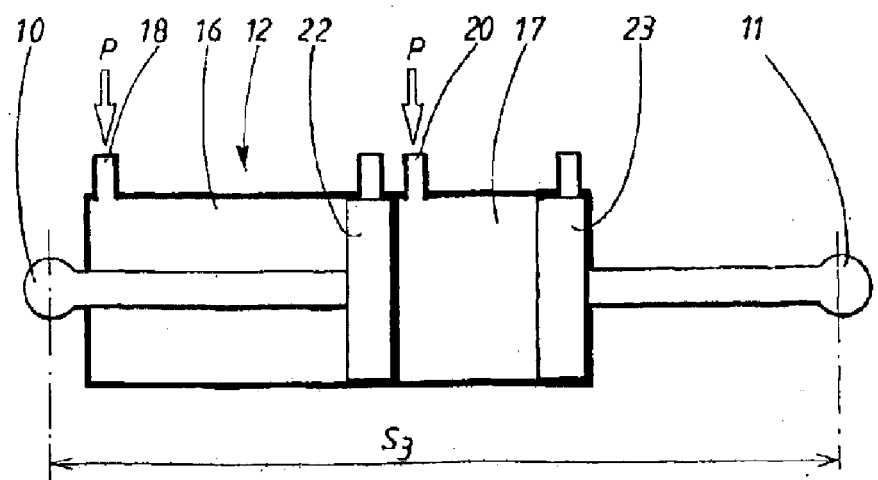

The functioning of the cylinder 12, according to a first embodiment, can be seen diagrammatically in FIGS. 2A and 2B. As can be seen from the figures, the cylinder 12 is provided with a partition 15 that divides it into two separate chambers 16, 17. Each chamber 16 and 17 is provided with two connections 18, 19 and, respectively, 20, 21 for pressurizing or alternatively venting or connection to an outlet, depending on the function desired. The connections 18, 19, 20, 21 are located at respective ends of each chamber 16, 17, on each side of a piston 22, 23 fixed to a respective piston rod 13, 14.

In a first preferred and illustrative embodiment, the first piston 22 of the cylinder is freely movable in a first chamber 16, the two connections 18, 19 of which are vented. In this case, the second chamber 17 of the cylinder is pressurized with a pressure, p, via the connection 21. The second piston 23 is positioned in its inner end position in contact with the partition 15 of the cylinder. This results in the self-steering wheels being free to pivot, the wheel deflection to the right or the left being proportional to half the stroke length S1 of the first piston rod 13 as shown in FIG. 2A. The freely movable state is maintained as long as the vehicle is driven at low speeds, preferably when maneuvering in tight spaces. When traveling at higher speeds or when reversing, it is desirable to center the wheels. By pressurizing the two chambers 16, 17 with a pressure, p, via the connections 18 and 20, the cylinder 12 adopts a centered position as shown in FIG. 2B. The first piston 22 is then positioned in its inner end position in contact with the partition 15 of the cylinder, while the second piston is positioned in its outer end position in contact with one end surface of the cylinder. In this way, the cylinder arrangement adopts a fixed, predetermined position with a fixed distance S3 between the outer ends 10, 11 of the piston rods, the wheels adopting a centered position parallel to the longitudinal direction of the vehicle.

A preferred size ratio $S_1:S_2$ between the stroke length of the first and second pistons is in the order of 2:1. This means that activation of the system from a pressurized (FIG. 2B) to a freely movable state (FIG. 2A) forces the whole cylinder 12 to move over the entire stroke length $S_2$ of the second piston 23 when the second chamber is pressurized. The position of the first piston 22 relative to the cylinder 12 is then the distance $S_1/2$ into the first chamber 16. The first piston 22 is thus correctly positioned in order to allow an equal wheel deflection in both directions.

According to a further embodiment, it is also possible to make both of the pistons 22, 23 freely movable when self-steering of the wheels is desired. This is brought about by virtue of all the connections 18, 19, 20, 21 of the two pistons 22, 23 being vented or connected to an outlet, from a pressurized state according to FIG. 2B. It is thus possible either to move the cylinder 12, including the piston 22, in a first direction, or alternatively to move the piston 22 in a second direction for wheel deflection in any direction. In this case, the wheel deflection is proportional to the combined stroke length $S_1+S_2$ of the two pistons 22, 23. If the same geometry as in the illustrative embodiment above is used, this can be made use of in order to give a greater wheel deflection or so as to allow the use of a shorter cylinder while maintaining the wheel deflection.

Figure 3:
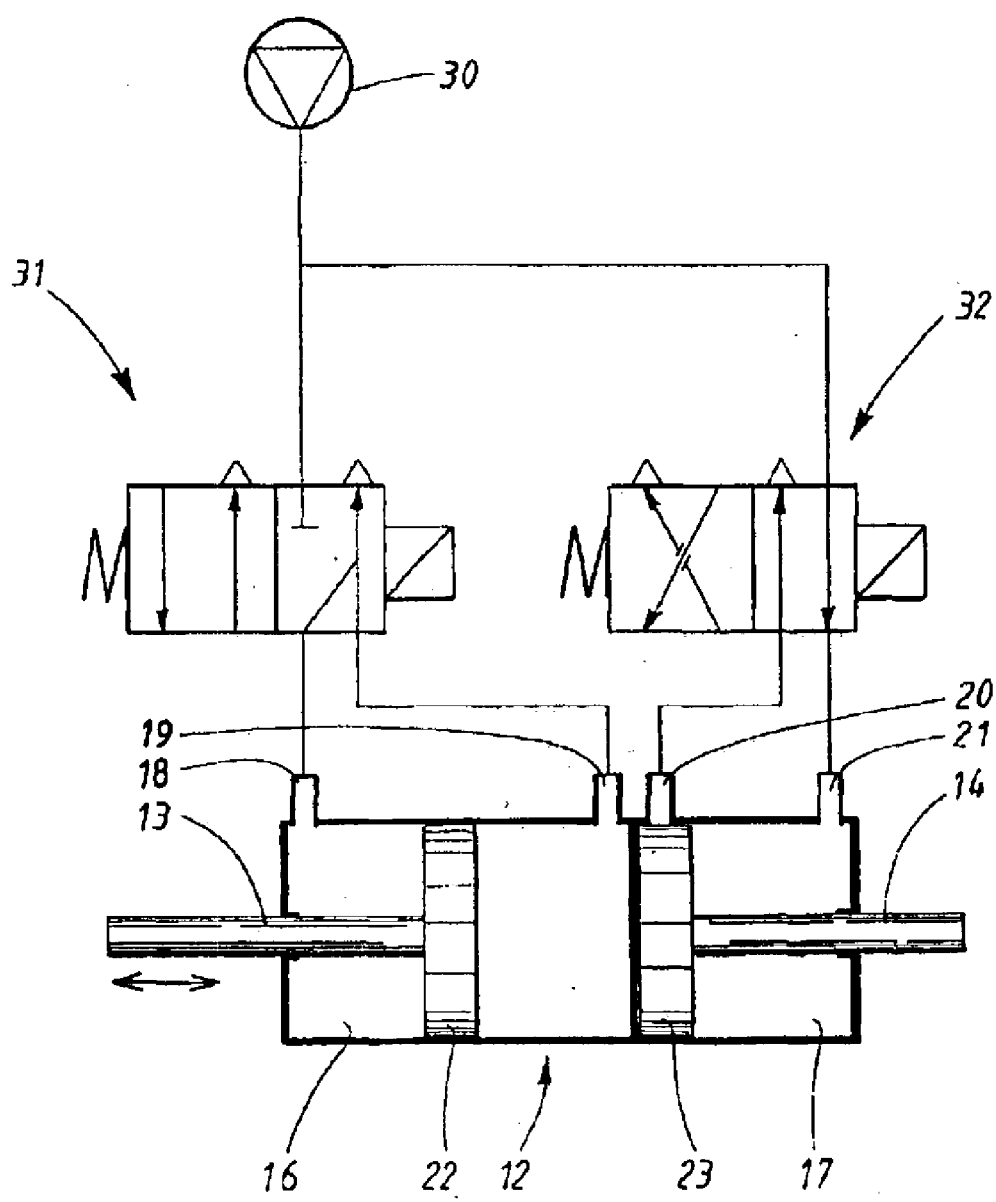
FIG. 3 shows a first embodiment of a pneumatically operated system.

FIG. 3 shows an example of a pneumatically operated cylinder 12 that is supplied with compressed air from a pressure source 30. Coupled in between the pressure source 30 and the two chambers 16 and 17 is a pair of electrically operated solenoid valves 31 and 32, respectively. The figure shows the solenoid valves 31, 32 in the activated position, with the first piston 22 freely movable and the second piston 23 pressurized toward its inner end position. Both of the connections 18, 19 of the first chamber 16 are in this case coupled to an outlet duct of a first valve 31 for venting. The first connection 20 of the second chamber is coupled to an outlet duct of a second valve 32 for venting, while its second connection 21 is coupled to the pressure source 30 for pressurizing the chamber 17. When the self-steering position is to cease, the solenoid valves, which are spring-loaded toward a normal position for pressurizing the first connections 18, 20 of the two chambers, are deactivated. The second connections 19 and, respectively, 21 of the two chambers are then coupled to an outlet duct of the first and, respectively, the second valve 31, 32 for venting.

Figure 4:
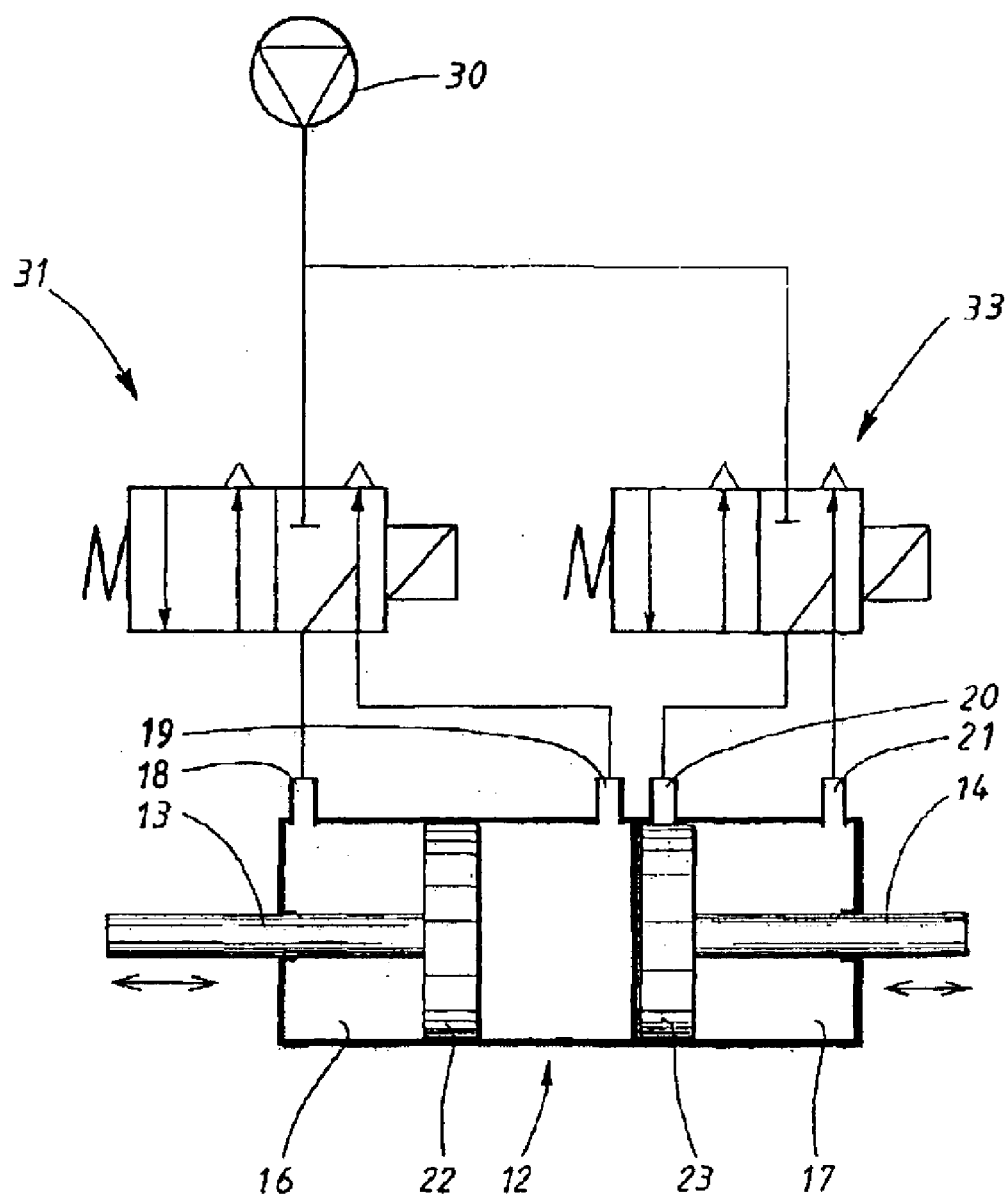
FIG. 4 shows a second embodiment of a pneumatically operated system.

FIG. 4 shows a connection diagram for an alternative embodiment, where both the pistons 13, 14 are freely movable in a self-steering position. This embodiment differs from that described in connection with FIG. 3 in that a second solenoid valve 33, in its active position, couples both the connections 20, 21 of the second chamber 17 to an outlet duct for venting. In the self-steering position, both of the pistons 22, 23 are thus freely movable. In order to return to the normal driving position, the two solenoid valves 31, 33 are deactivated as described above.

Figure 5:
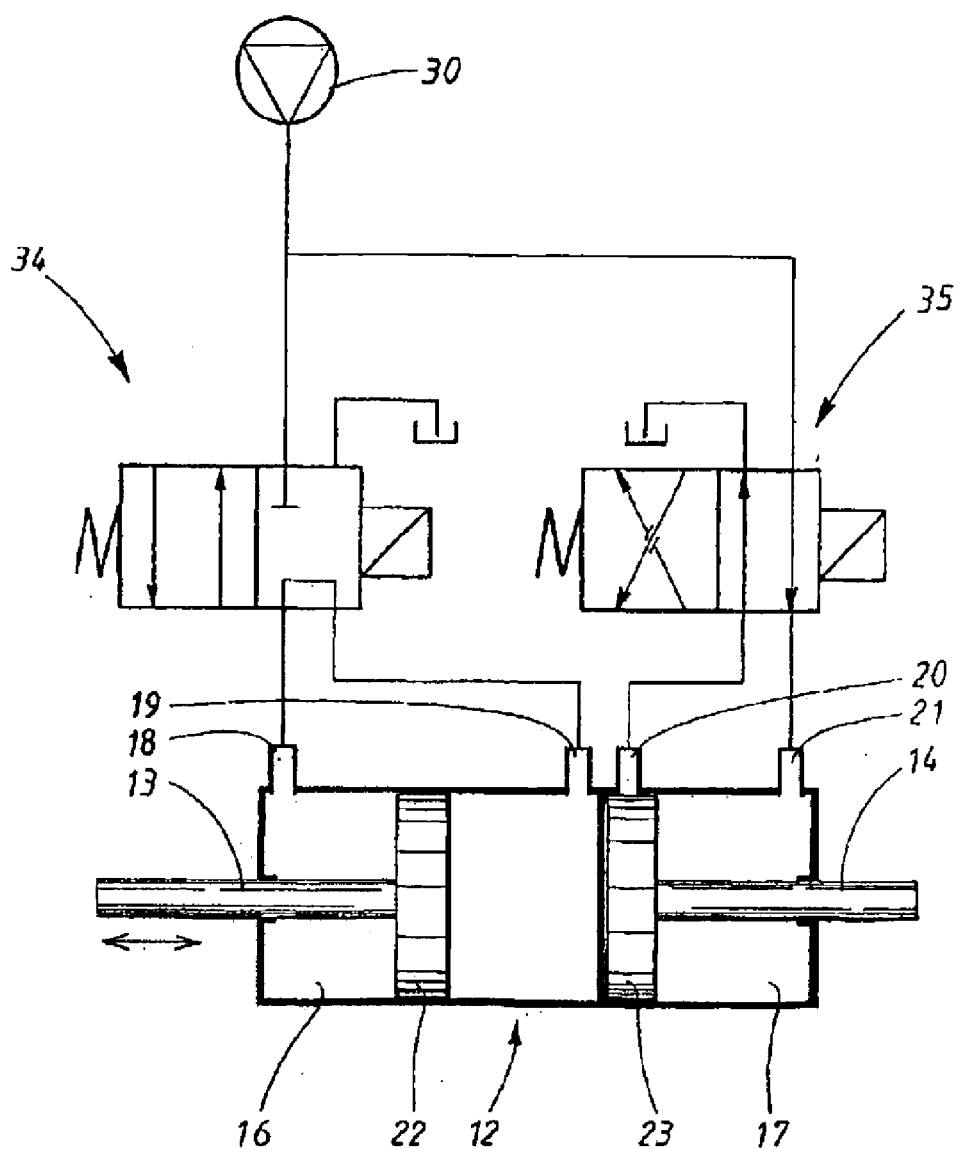
FIG. 5 shows a first embodiment of a hydraulically operated system.

FIG. 5 describes a hydraulically driven cylinder that is intended to correspond to the pneumatic system according to FIG. 3. The main difference between the systems is that the connections 18, 19 of the first chamber 16 are coupled to one another in order that a hydraulic medium will be capable of flowing between the two sides of the chamber when the piston 13 is acted on in self-steering position. The first connection 20 of the second chamber 17 is coupled to an outlet duct for draining. In other respects, the functioning of the cylinder is the same as described in connection with FIG. 3.

Figure 6:
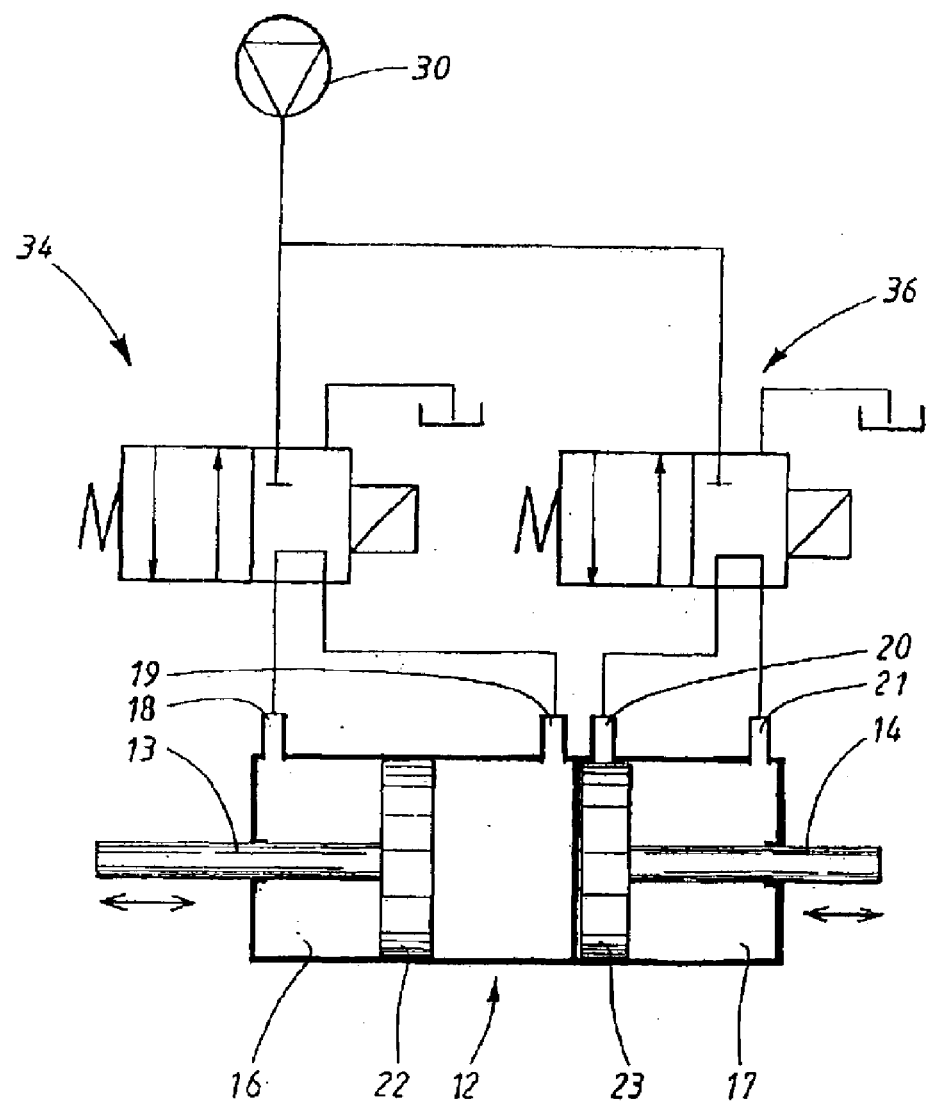
FIG. 6 shows a second embodiment of a hydraulically operated system.

In the same way, FIG. 6 concerns a hydraulically driven cylinder with the same functioning as described in connection with FIG. 4. In the self-steering position, the connections 18, 19 of the first chamber 16 are coupled to one another and the two connections 20, 21 of the second chamber 17 are coupled to one another in order to make it possible for a hydraulic medium to be capable of flowing between the two sides of the chambers in self-steering position. The two solenoid valves 34, 36 can in this case be completely identical. The main difference between the pneumatic systems configured according to FIGS. 3 and 4 and the hydraulic systems configured according to FIGS. 5 and 6 is that the former can simply be vented as necessary, while the latter have a pressure medium which requires a more complicated, closed system. However, the control of the cylinder 12 and its pistons 22, 23 is identical in both cases in order to obtain the desired functioning.

The pressure source can consist of a separate unit, for example a compressor and an accumulator, or alternatively a hydraulic pump, mounted in association with the wheel axle concerned, or a line from the existing pressure supply system of the vehicle. The included solenoid valves can be activated by the same input signal, which is preferably coupled to an electronic control unit that activates these when the speed of the vehicle in its normal direction of travel falls below a certain level. The signal is interrupted if, for example, a reverse gear is engaged. Manual activation/deactivation of the system is of course also possible. The solenoids are preferably of standard type, but it is of course also possible to replace the valve pairs described above with one valve that integrates all the functions and is controlled by a single solenoid.

What is claimed is:

1. An arrangement for operating self-steering wheels on a non-driving axle in a vehicle, the arrangement comprising:
   self-steering wheels, each connected to a non-driving axle by a stub axle and said stub axles being interconnected by a tie rod;
   a piston and cylinder arrangement connecting the non-driving axle and at least one of the stub axles, a cylinder of the piston and cylinder arrangement having a fixed partition establishing a first and a second chamber, the first and the second chamber each having an individually adjustable piston, and the first and the second chamber each having two connections for at least one of supply and discharge of pressure medium acting on the respective piston in the cylinder.

2. The arrangement as recited in claim 1, wherein the piston in the first chamber has a first piston having a piston rod connected to one stub axle and the piston in the second chamber has a second piston having a piston rod connected to the axle.

3. The arrangement as recited in claim 2, wherein, in the first, freely movable state of the piston and cylinder arrangement, the connections of the first chamber are open to the atmosphere so that the first piston is freely movable.

4. The arrangement as recited in claim 3, characterized in that, in the first, freely movable state of the piston and cylinder arrangement, the connections of the second chamber are open to the atmosphere so that the second piston is freely movable.

5. The arrangement as recited in claim 3, characterized in that, in the first, freely movable state of the piston and cylinder arrangement, the connections of the second chamber are open to one another so that the second piston is freely movable.

6. The arrangement as recited in claim 2, wherein, in the first, freely movable state of the piston and cylinder arrangement, the connections of the first chamber are open to one another so that the first piston is freely movable.

7. The arrangement as recited in claim 6, wherein, in the first, freely movable state of the piston and cylinder arrangement, the connections of the second chamber are open to the atmosphere so that the second piston is freely movable.

8. The arrangement as recited in claim 6, wherein, in the first, freely movable state of the piston and cylinder arrangement, the connections of the second chamber are open to one another so that the second piston is freely movable.

9. The arrangement as recited in claim 3, wherein, in the first, freely movable state of the piston and cylinder arrangement, one connection of the second chamber is pressurized, so that the second piston is displaced into an inner end position located adjacent to the partition.

10. The arrangement as recited in claim 2, wherein, in the second, pressurized state of the piston and cylinder arrangement, one connection of the first chamber is pressurized, so that the first piston is displaced into an inner end position located adjacent to the partition.

11. The arrangement as recited in claim 10, wherein, in the second, pressurized state of the cylinder, the second connection of the second chamber is pressurized, so that the second piston is displaced into an outer end position located adjacent to one end surface of the cylinder.

12. The arrangement as recited in claim 10, wherein the piston and cylinder arrangement is connected to a stub axle via a steering rod mounted on the stub axle.

13. A method for operating self-steering wheels on a non-driving axle in a vehicle, the method comprising:
   providing an arrangement having: wheels that are, one each, mounted on stub axles to a non-driving axle, the stub axles being interconnected by a tie rod; a piston and cylinder arrangement interconnecting the non-driving axle and one of the stub axles; a cylinder of the piston and cylinder arrangement being provided with two separate chambers, each chamber having a piston thereby permitting the piston and cylinder arrangement to be adjustable between two states and each chamber having at least one connection for pressure medium for acting on the respective piston in the cylinder, the adjustment between the states being effected by:
   opening the connections of at least a first chamber to the atmosphere or an outlet so that the respective piston is freely movable, and as a result of which, the length of the piston and cylinder arrangement is variable thereby enabling self-steering.

14. A method for operating self-steering wheels on a non-driving axle in a vehicle, the method comprising:
   providing an arrangement having: wheels that are, one each, mounted on sub axles to a non-driving axle, the stub axles being interconnected by a tie rod; a piston and cylinder arrangement interconnecting the non-driving axle and one of the stub axles; a cylinder of the piston and cylinder arrangement being provided with two separate chambers, each chamber having a piston thereby permitting the piston and cylinder arrangement to be adjustable between two states and each chamber having at least one connection for pressure medium for acting on the respective piston in the cylinder, the adjustment between the states being effected by:
   pressuring both chambers so that the pistons each adopt their own end position in the piston and cylinder arrangement thereby the piston and cylinder arrangement to adopt a predetermined length thereby locking the wheels in a position parallel to a longitudinal direction of the vehicle.

* * * * *